US010245991B1

(12) United States Patent
Salter et al.

(10) Patent No.: US 10,245,991 B1
(45) Date of Patent: Apr. 2, 2019

(54) ILLUMINATED FLOOR MAT RETENTION ASSEMBLY

(71) Applicant: Ford Global Technologies, LLC, Dearborn, MI (US)

(72) Inventors: Stuart C. Salter, White Lake, MI (US); Wei Xu, Nanjing (CN); Satyanarayana Raju Vemulapati, Westland, MI (US); Gary D. Mullen, Plymouth, MI (US); Matthew Anthony Majkowski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/833,225

(22) Filed: Dec. 6, 2017

(51) Int. Cl.
*B60N 3/04* (2006.01)
*B60Q 3/51* (2017.01)
*B60Q 3/20* (2017.01)
*F21W 106/00* (2018.01)

(52) U.S. Cl.
CPC ............ *B60N 3/046* (2013.01); *B60Q 3/20* (2017.02); *B60Q 3/51* (2017.02); *F21W 2106/00* (2018.01)

(58) Field of Classification Search
CPC ........ B60N 3/046; B60N 3/048; B60N 3/044; A47G 27/0293; B60Q 3/51; B60Q 3/20
USPC ...................................... 296/97.23; 362/488
See application file for complete search history.

(56) References Cited

U.S. PATENT DOCUMENTS

| 6,099,137 | A  | * | 8/2000  | McCormack | A61L 9/03 |
| | | | | | 219/202 |
| 8,851,551 | B1 | * | 10/2014 | Kaufman | B60N 3/046 |
| | | | | | 16/4 |
| 2002/0078537 | A1 | * | 6/2002 | Shibuya | A47G 27/0418 |
| | | | | | 24/662 |
| 2010/0080014 | A1 | * | 4/2010 | Ichikawa | B60Q 3/51 |
| | | | | | 362/546 |
| 2010/0212119 | A1 | * | 8/2010 | Dendo | B60N 3/046 |
| | | | | | 24/453 |
| 2015/0224919 | A1 | * | 8/2015 | Sobecki | B60Q 1/2615 |
| | | | | | 353/13 |
| 2017/0028895 | A1 | * | 2/2017 | Masanek, Jr. | B60N 3/044 |

FOREIGN PATENT DOCUMENTS

JP         2013103520 A      5/2013

OTHER PUBLICATIONS

Toauto 4pcs 3w Daytime Running Lights 6000k Plate Screw Bolt LED Day Light LED Car Styling 12V, www.aliexpress.com, 6 pages, 2017.
Dei Lite'N Boltz Red LED Lighted Button Head Bolts, www.knowwhere2jeep.com, Manufacturer: Design Engineering Inc, 1 page, 2017.

* cited by examiner

*Primary Examiner* — Jason S Morrow
(74) *Attorney, Agent, or Firm* — Vichit Chea; Price Heneveld LLP

(57) ABSTRACT

An illuminated vehicle floor mat retention assembly is provided. The illuminated vehicle floor mat retention assembly includes a fastener configured to fasten a floor mat onto a vehicle floor, a light transmissive window provided in the fastener, and a light source located proximate to the fastener for generating light to be output through the light transmissive window.

18 Claims, 3 Drawing Sheets

ILLUMINATED FLOOR MAT RETENTION ASSEMBLY

FIELD OF THE INVENTION

The present invention generally relates to retention assemblies for retaining floor mats onto a surface, such as on a vehicle floor, and more particularly relates to an illuminated floor mat retention assembly.

BACKGROUND OF THE INVENTION

Automotive vehicles are commonly equipped with floor mats, such as rubber mats and/or carpeted mats that line the foot well area of the passenger compartment. Vehicle floor mats are often retained onto the underlying floor with the use of one or more retention features to hold the floor mat in place to prevent the floor mat from sliding. Such retention features may include snap fit connectors on the floor mat and floor that matingly connect together. It would be desirable to provide for an enhanced functionality retention assembly for retaining a floor mat on a floor, particularly on a vehicle.

SUMMARY OF THE INVENTION

According to one aspect of the present invention, an illuminated floor mat retention assembly is provided. The illuminated floor mat retention assembly includes a fastener having a housing configured to fasten a floor mat onto a floor, a light transmissive window provided in the housing, and a light source located proximate to the fastener for generating light to be output through the window.

Embodiments of the first aspect of the invention can include any one or a combination of the following features:
- the fastener comprises an upper grommet and a lower grommet, wherein the lower grommet is fixedly connected to the floor and the upper grommet fastens onto the lower grommet;
- the upper grommet and lower grommet each comprise threaded surfaces to form a screw connection;
- the retention assembly further includes a lens optically aligned with the light transmissive window;
- the light transmissive window defines an image pattern;
- the image pattern comprises a logo;
- the light source comprises a light-emitting diode; and
- the assembly is located on a vehicle.

According to another aspect of the present invention, an illuminated vehicle floor mat retention assembly is provided. The illuminated vehicle floor mat retention assembly includes a fastener configured to fasten a floor mat onto a vehicle floor, a light transmissive window provided in the fastener, and a light source located proximate to the fastener for generating light to be output through the window.

Embodiments of the second aspect of the invention can include any one or a combination of the following features:
- the fastener comprises an upper grommet and a lower grommet, wherein the lower grommet is fixedly connected to the vehicle floor and the upper grommet fastens onto the lower grommet;
- the upper grommet and lower grommet each comprise threaded surfaces to form a screw connection;
- the retention assembly further includes a lens optically aligned with the window;
- the light transmissive window defines an image pattern;
- the image pattern comprises a logo; and
- the light source comprises a light-emitting diode.

According to a further aspect of the present invention, an illuminated vehicle floor mat retention assembly is provided. The illuminated vehicle floor mat retention assembly includes a lower grommet fixedly connected to a vehicle floor, an upper grommet configured to engage the lower grommet to fasten a floor mat onto the vehicle floor, a light transmissive window provided in the upper grommet, and a light source located proximate to the upper grommet for generating light to be output through the window.

Embodiments of the third aspect of the invention can include any one or a combination of the following features:
- the upper grommet and lower grommet each comprise threaded surfaces to form a screw connection;
- the retention assembly includes a lens optically aligned with the window;
- the light transmissive window defines an image pattern; and
- the image pattern comprises a logo.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
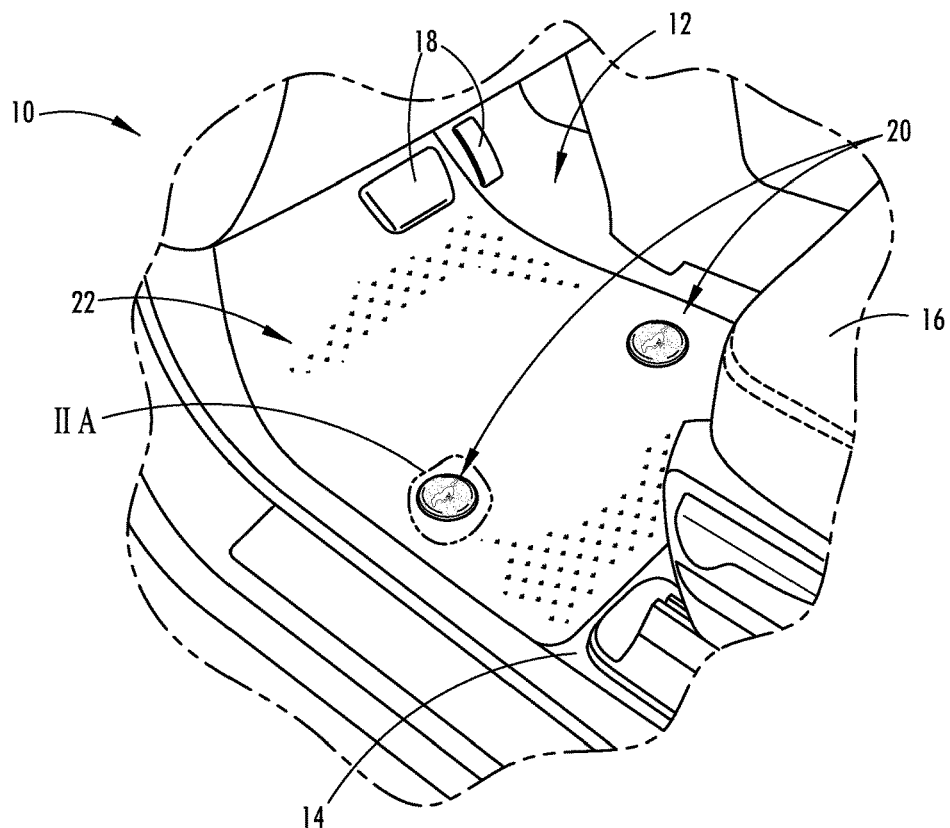
FIG. 1 is an elevated perspective view of a foot well area of a vehicle having a floor mat retained on the floor with an illuminated floor mat retention assembly, according to one embodiment.

Referring now to FIG. 1, a vehicle 10 is generally illustrated having a foot well area 12 generally shown located forward of a seat 16 and having a floor 14 on the bottom and driver foot operated pedals 18 extending above the floor 14. The drive foot operated pedals may include the acceleration foot pedal and the brake foot pedal. The foot well area 12 generally is the area where the feet of a vehicle passenger, such as a driver or other seated passenger, are located when the passenger is normally seated in the seat 16. The vehicle floor 14 typically includes a floor board such as a metal sheet serving as the floor of the vehicle body and may include a fixed or permanent carpet or mat that covers the metal sheet. In order to limit wear and tear and dirt to the fixed or permanent floor components, the vehicle 10 may include one or more removable floor mats 22 that are positioned on top of the floor 14. The floor mats 22 may each be removably connected to the floor 14 with the use of one or more illuminated floor mat retention assemblies 20.

The illuminated floor mat retention assembly 20 when assembled to the floor mat 22 on the floor 14 serves to retain the floor mat 22 in a fixed position on the floor 14 such that the floor mat 22 does not slide or move positions on the floor 14. Additionally, the illuminated floor mat retention assembly 20 includes a light illuminated assembly that provides light illumination that may provide ambient lighting and be decorative and may illuminate light in an image pattern, such as a logo as shown. In the embodiment shown, two illuminated floor mat retention assemblies 20 are illustrated retaining a single floor mat 22 on the floor 14, however, it should be appreciated that one or more illuminated floor mat retention assemblies 20 may be used to retain each floor mat 22. It should further be appreciated that floor mats 22 may be installed and retained with illuminated floor mat retention assemblies 20 in each foot well area 12 of the vehicle 10 and that floor mats 22 and illuminated floor mat retention assemblies 20 may also be provided in storage compartments of the vehicle, such as in the rear cargo area or trunk of the vehicle 10, according to other embodiments.

Figure 2:
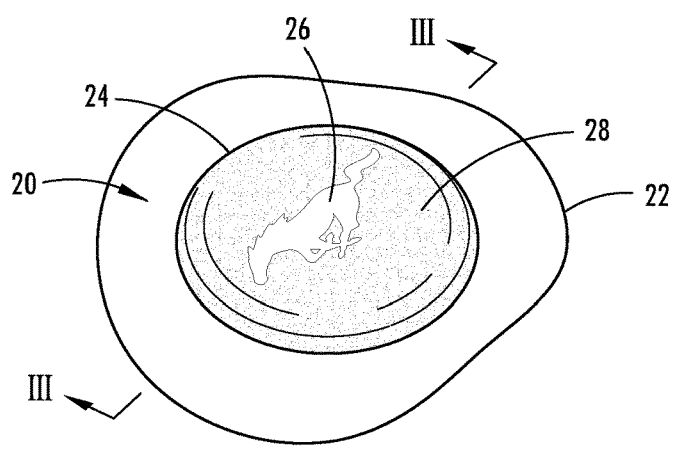
FIG. 2 is an enlarged view of one of the illuminated floor mat retention assemblies shown in FIG. 1.
Figure 3:
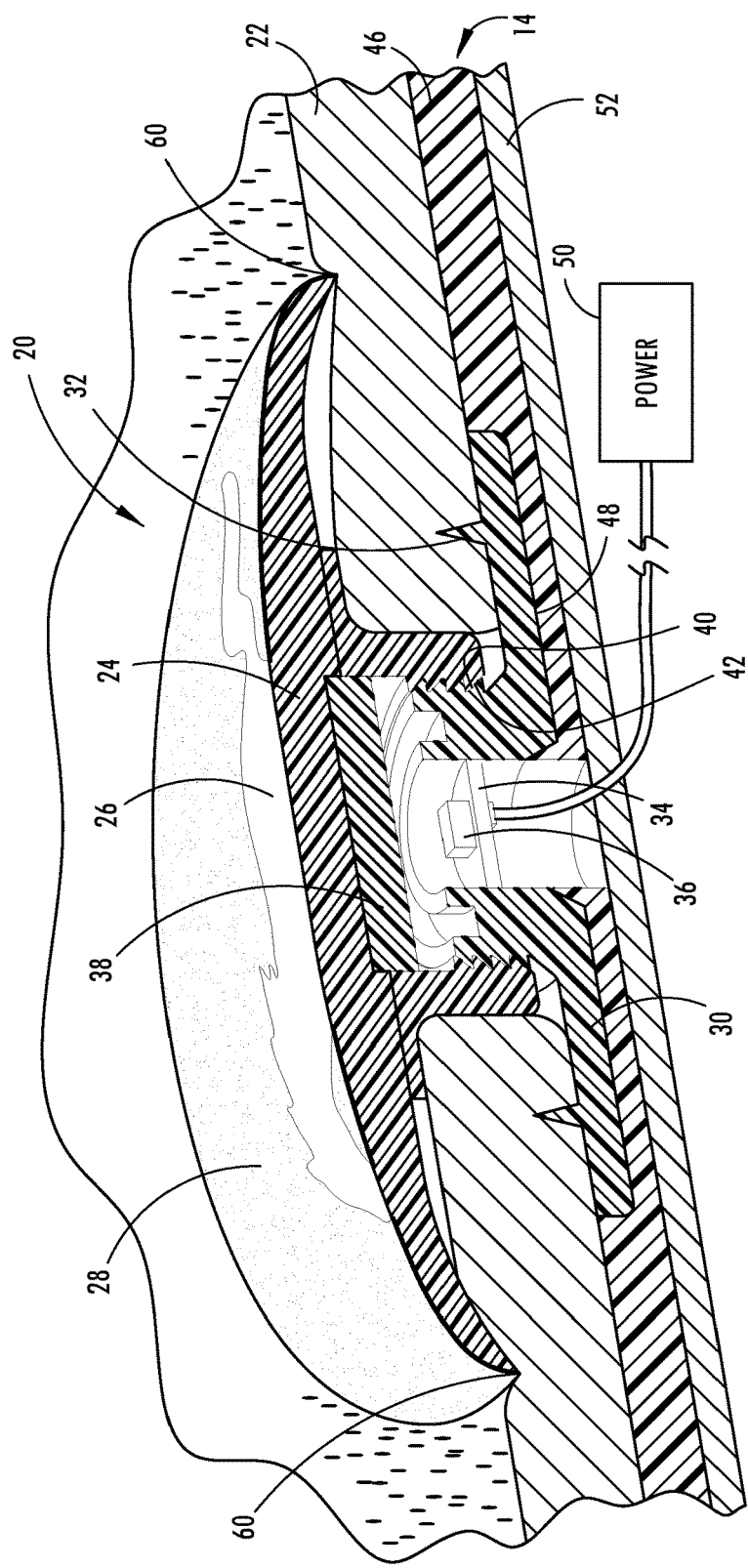
FIG. 3 is a cross-sectional perspective view taken through line III-III of FIG. 2 further illustrating the illuminated floor mat retention assembly.
Figure 4:
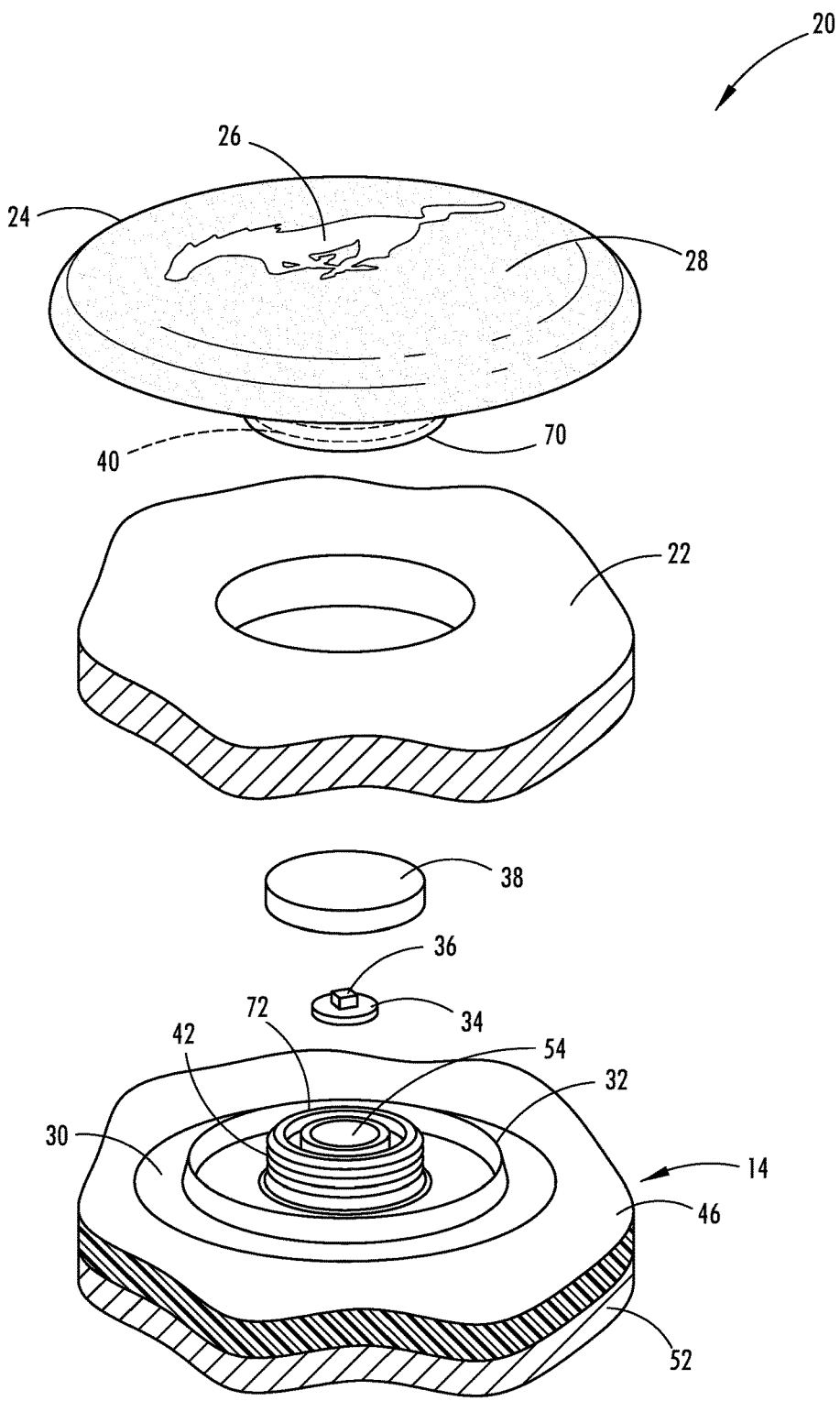
FIG. 4 is an exploded view of the illuminated floor mat retention assembly and floor mat shown in FIG. 1.

The illuminated floor mat retention assembly 20 is further illustrated in FIG. 2 in an enlarged view having a fastener that includes an upper grommet 24 on the top side which includes a light transmissive window 26 shown the shape of a decorative image pattern, such as a logo, that may be illuminated with light and further having an opaque portion 28 surrounding the light transmissive window 26. The opaque portion 28 is not light transparent such that it blocks and prevents light illumination from transmitting through that portion of upper grommet 24. The light transmissive member 26 allows light illumination to be transmit through the light transmissive window 26 so as to give the effect of a glowing image pattern which may be configured as a logo, according to one embodiment. As such, the upper grommet 24 of the fastener has a housing with the light transmissive window 26 provided therein.

The illuminated floor mat retention assembly 20 includes a lower grommet 30 shown assembled into a recess 48 in a fixed carpet 46 on top of a metal sheet 52 of the floor 14. The lower grommet 24 is thereby fixed to the floor 14. Together the upper grommet 24 and lower grommet 30 form a fastener to fasten the floor mat 22 onto the floor 14. The floor 14 may include a fixed carpet 46 and/or a rubber mat and a metal sheet 52 or other supportive floor board or substrate. The lower grommet 30 may be heat staked to the fixed carpet 46 or adhered or otherwise fastened onto the floor 14. As such, the lower grommet 30 is fixed in place on the floor 14.

The lower grommet 30 and upper grommet 24 forming the fastener cooperate together so as to sandwich a portion of the floor mat 22 to retain the floor mat 22 in a fixed position on top of the floor 14. To do so, the upper grommet 24 has a lower extending cylindrical collar 70 with a first threading 40 provided on an interior surface thereof. The lower grommet 30 has an upper extending collar 72 with second threading 42 provided on an exterior surface thereof. The respective collars 70 and 72 of the upper grommet 24 and lower grommet 30 are adapted to matingly fit one inside the other so that the first threading 40 engages the second threading 42 to allow the upper grommet 24 to screw onto and off the lower grommet 30 between a fastened position retaining the floor mat 22 and an unfastened position that allows for removal of the floor mat 22. The upper grommet 24 may be rotated and thereby threaded onto the lower grommet 30 by turning the upper grommet 24 in one rotational direction (e.g., clockwise) a sufficient number of turns until the floor mat 22 is fastened into a fixed position.

The lower grommet 30 may be heat staked to the carpet 46 of the floor 14 within recess 48. The lower grommet 30 may also include an upstanding V-shaped ring 32 that forms a tooth for frictionally engaging the bottom side of the floor mat 22 to prevent sliding motion of the floor mat 22 relative to the lower grommet 30. The upper grommet 24 has a peripheral edge 60 that extends downward to form a tooth for fricitonally engaging the top side of the floor mat 22. As such, when the upper grommet 24 is fastened onto the lower grommet 30, the peripheral edge 60 of the upper grommet 24 compresses downward onto the floor mat 22 to retain the floor mat 22 in a fixed position.

Formed centrally within the collar 72 of the lower grommet 30 is an opening 54 for receiving power and circuit components for generating and transmitting light. Included within the opening 54 is a printed circuit board (PCB) 34 and a light source 36 in the form of a light-emitting diode (LED) assembled onto the top surface of the PCB 34. The light source 36 receives electrical power from a power source 50 and generates light illumination generally directed upward. The power may be vehicle electrical power supplied from the vehicle battery via wiring passing under fixed carpet 46. In addition, the light source 36 may be controlled by a controller to be activated with vehicle ambient lighting. Disposed above the light source 36 is an optic lens 38. The optic lens 38 receives the light emitted from the light source 36 and distributes the light within a wide angle thereabove so as to cover a substantial portion of the upper surface of the upper grommet 24, including substantially all of the light transmissive window 26.

The upper grommet 24 is made of an optically light transmissive material, such as a polycarbonate. A portion of the upper grommet 24 has the light transmissive window 26 in the shape of a desired image, such as a logo, to allow light emitted from the LED 36 to pass through lens 38 and be emitted through the light transmissive window 26. The remaining surface of the upper grommet 24 has an opaque surface coating on the opaque portion 28 that prevents light from being transmitted therethrough.

The fastener for fastening the floor mat 22 onto the vehicle floor 14 is shown and described herein having both an upper grommet 24 and a lower grommet 30. However, it should be appreciated that the illuminated vehicle floor mat retention assembly 20 may employ an upper grommet 24 without a lower grommet 30. It should further be appreciated that other types of fasteners may be employed to fasten the floor mat 22 onto the vehicle floor 14. For example, a push-type connection, such as a Christmas tree connector may be employed, wherein a top connector piece has a housing provided with a light transmissive window configured to receive light output from the light source.

Accordingly, the illuminated floor mat retention assembly 20 advantageously retains a floor mat 22 in a fixed position on a floor 14 of a vehicle 10 and provides a decorative light illuminated image pattern. The illuminated image pattern is both decorative and also provided a lighted location of the floor mat 22 connection such that a user may easily disconnect the illuminated floor mat retention assembly 20 to remove the floor mat 22, such as for cleaning or replacement. It should be appreciated that the illuminated floor mat retention assembly 20 may be easily disassembled by rotating the upper grommet 24 relative to the lower grommet 30 to unfasten the fastener and allow the floor mat 22 to be removed. The illuminated floor mat retention assembly 20 may be reassembled and fastened onto the floor mat 22 and floor 14 by screwing the upper grommet 24 onto the lower grommet 30 with the floor mat 22 sandwiched therebetween.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illuminated floor mat retention assembly comprising:
   a fastener having a housing configured to fasten a floor mat onto a floor, wherein the fastener comprises an upper grommet and a lower grommet, wherein the lower grommet is fixedly connected to the floor and the upper grommet fastens onto the lower grommet;
   a light transmissive window provided in the housing; and
   a light source located proximate to the fastener for generating light to be output through the window.

2. The retention assembly of claim 1, wherein the upper grommet and lower grommet each comprise threaded surfaces to form a screw connection.

3. The retention assembly of claim 1 further comprising a lens optically aligned with the light transmissive window.

4. The retention assembly of claim 3, wherein the light transmissive window defines an image pattern.

5. The retention assembly of claim 4, wherein the image pattern comprises a logo.

6. The retention assembly of claim 1, wherein the light source comprises a light-emitting diode.

7. The retention assembly of claim 1, wherein the assembly is located on a vehicle.

8. An illuminated vehicle floor mat retention assembly comprising:
   a fastener configured to fasten a floor mat onto a vehicle floor, wherein the fastener comprises an upper grommet and a lower grommet, wherein the lower grommet is fixedly connected to the vehicle floor and the upper grommet fastens onto the lower grommet;
   a light transmissive window provided in the fastener; and
   a light source located proximate to the fastener for generating light to be output through the window.

9. The retention assembly of claim 8, wherein the upper grommet and lower grommet each comprise threaded surfaces to form a screw connection.

10. The retention assembly of claim 8 further comprising a lens optically aligned with the window.

11. The retention assembly of claim 10, wherein the light transmissive window defines an image pattern.

12. The retention assembly of claim 11, wherein the image pattern comprises a logo.

13. The retention assembly of claim 8, wherein the light source comprises a light-emitting diode.

14. An illuminated vehicle floor mat retention assembly comprising:
   a lower grommet fixedly connected to a vehicle floor;
   an upper grommet configured to engage the lower grommet to fasten a floor mat onto the vehicle floor;
   a light transmissive window provided in the upper grommet; and
   a light source located proximate to the upper grommet for generating light to be output through the window.

15. The retention assembly of claim 14, wherein the upper grommet and lower grommet each comprise threaded surfaces to form a screw connection.

16. The retention assembly of claim 14 further comprising a lens optically aligned with the window.

17. The retention assembly of claim 14, wherein the light transmissive window defines an image pattern.

18. The retention assembly of claim 17, wherein the image pattern comprises a logo.

* * * * *